Aug. 16, 1927. 1,638,980
G. L. CADMAN
DIFFERENTIAL GEARING
Filed Dec. 3, 1924 3 Sheets-Sheet 1
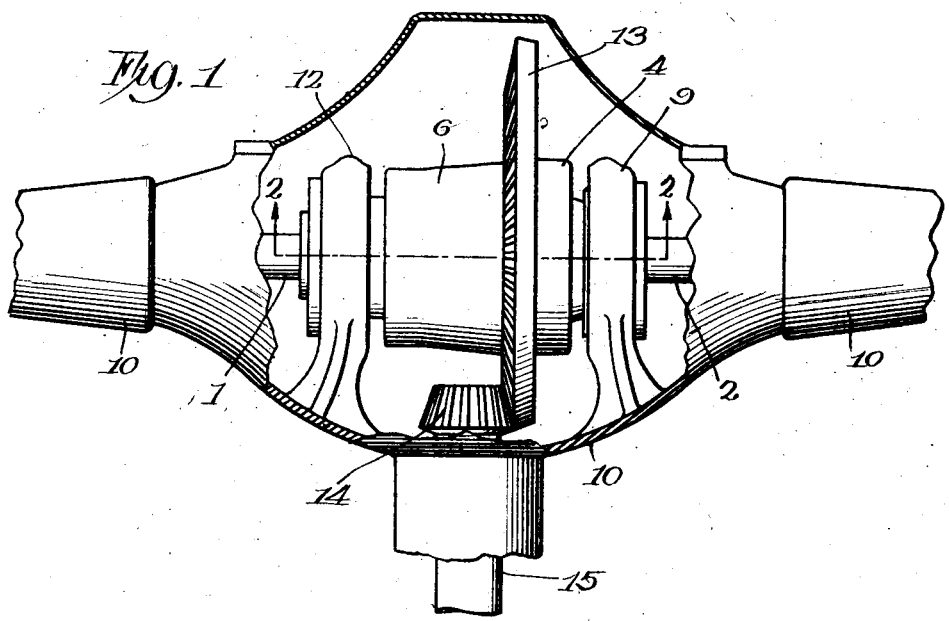
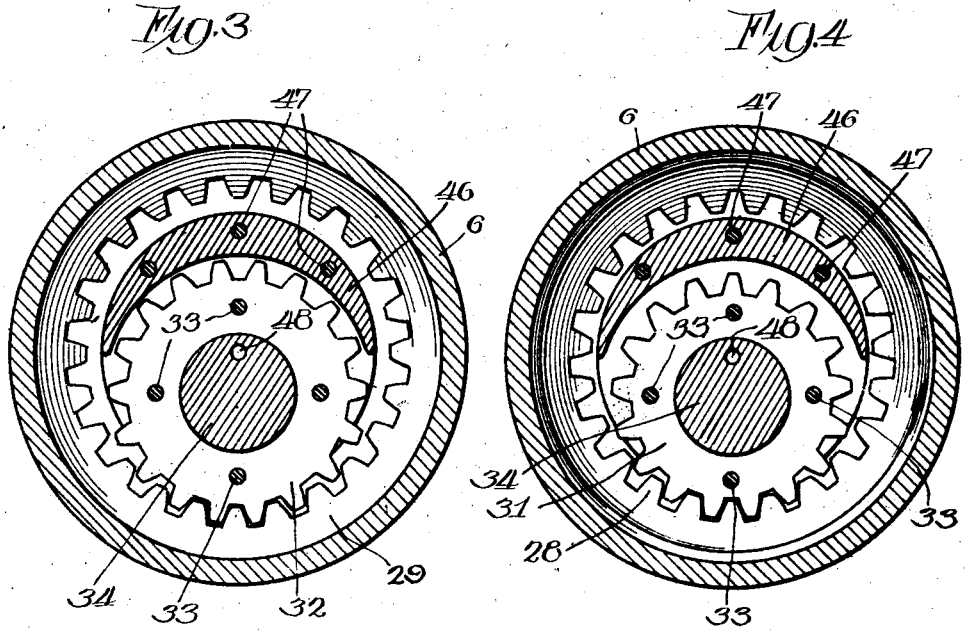
Inventor:
George L. Cadman
By Arthur F. Durand
Atty.

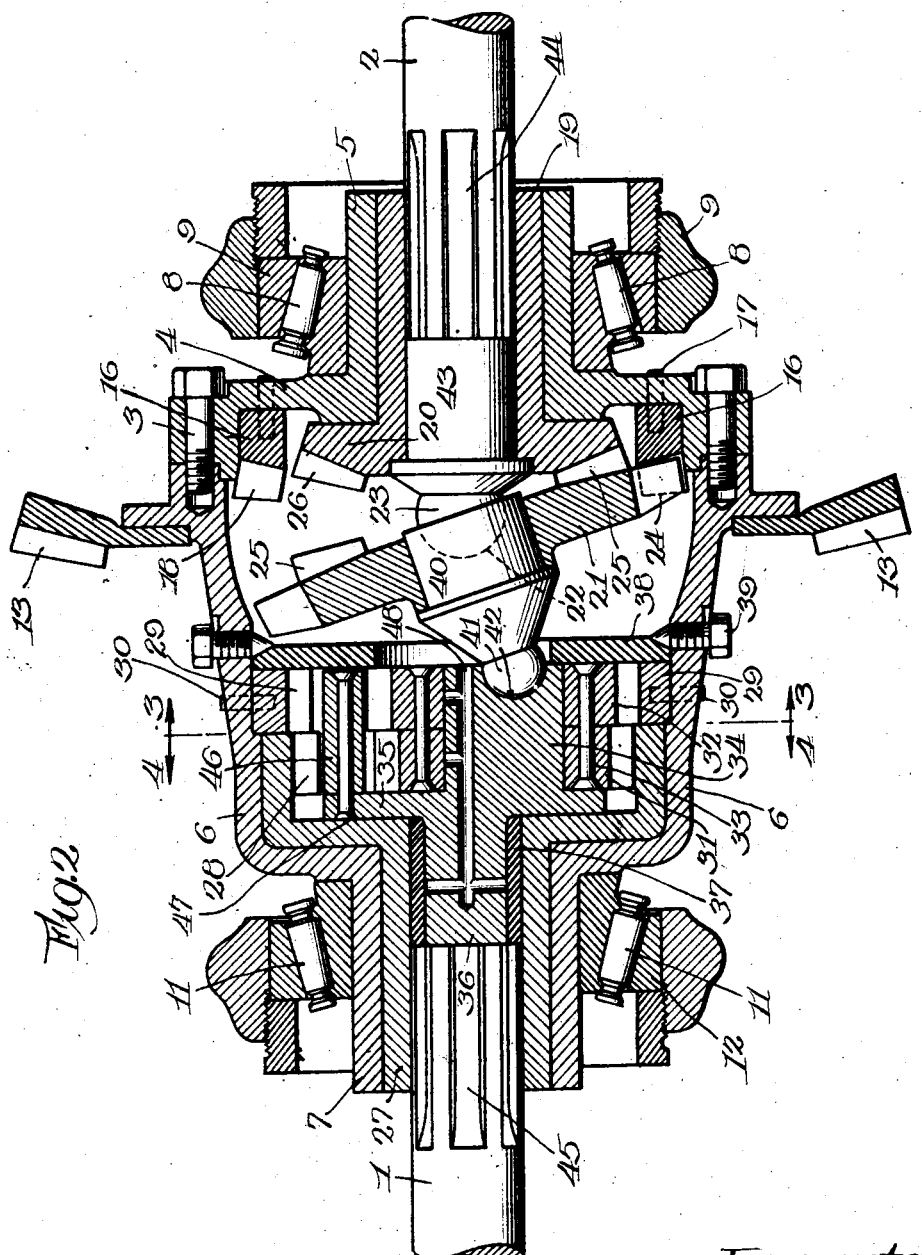

Aug. 16, 1927.
G. L. CADMAN
1,638,980
DIFFERENTIAL GEARING
Filed Dec. 3, 1924
3 Sheets-Sheet 3
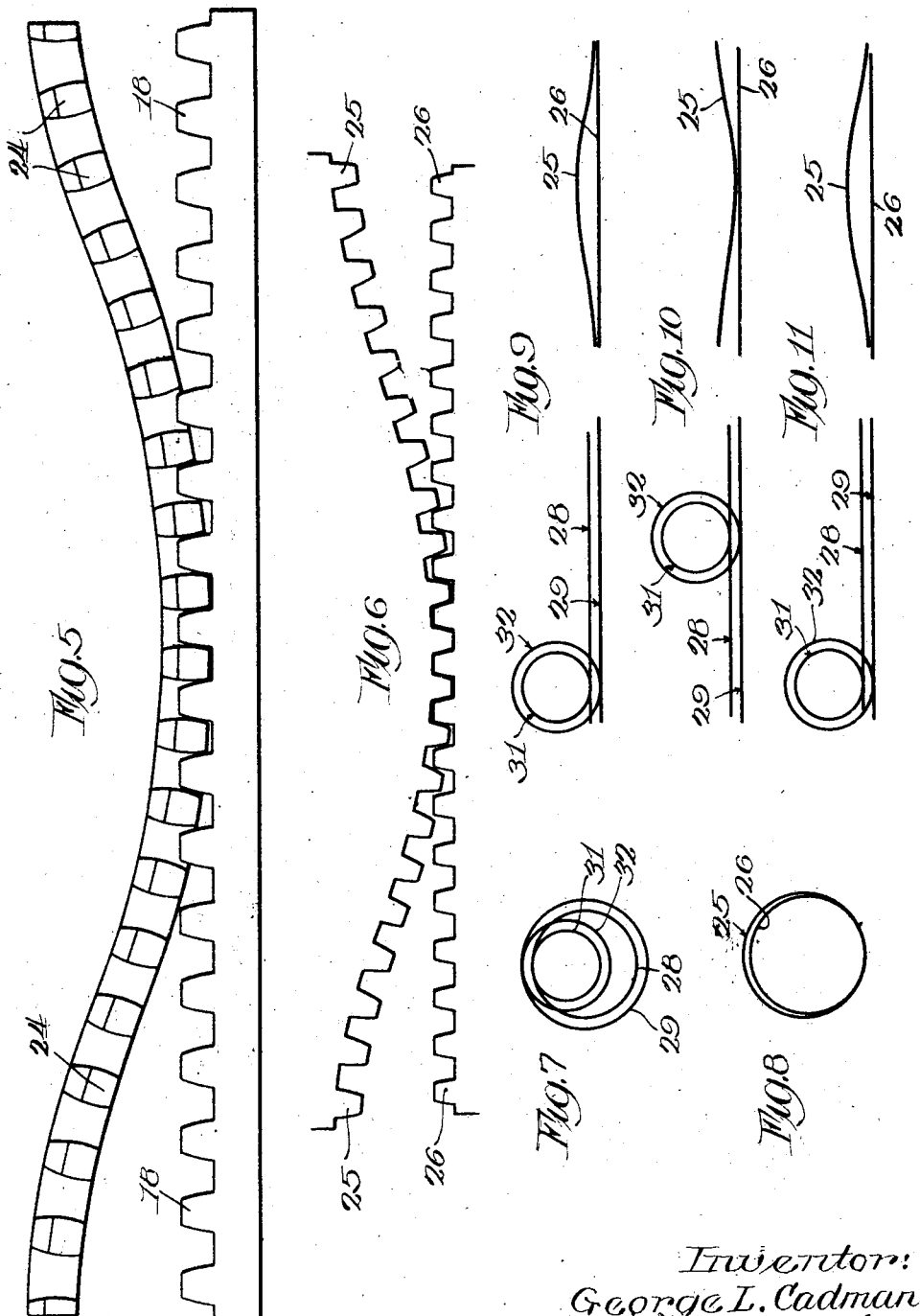
Inventor:
George L. Cadman
By Arthur F. Durand
Atty.

Patented Aug. 16, 1927.

1,638,980

UNITED STATES PATENT OFFICE.

GEORGE L. CADMAN, OF BELOIT, WISCONSIN.

DIFFERENTIAL GEARING.

Application filed December 3, 1924. Serial No. 753,600.

This invention relates to differential gearing for automobiles, motor trucks, or other situations requiring a differential power transmission.

Generally stated, the object of the invention is to provide a novel and improved construction whereby a satisfactory differential drive or transmission is provided, and whereby, at the same time, there will be no possibility of racing, for example, of either rear wheel of the automobile or motor truck, when one wheel is raised from the ground, such as the racing which takes place with the ordinary differential gearing, of course, when either rear wheel of the automobile or motor truck is lifted from the ground.

It is also an object to provide certain details and features of construction and combinations tending to increase the general efficiency and the desirability of differential gearing of this particular character.

To the foregoing and other useful ends, the invention consists in the matters hereinafter set forth and claimed, and shown in the accompanying drawings, in which,—

Fig. 1 is a plan view of a differential gearing embodying the principles of the invention, showing a portion of the axle and gearing housing broken away to show the said gearing.

Fig. 2 is an enlarged axial section of said gearing on line 2—2 in Fig. 1, looking in the direction indicated by the arrows.

Fig. 3 is a transverse, vertical section on line 3—3 in Fig. 2, looking to the right.

Fig. 4 is a similar section on line 4—4 in Fig. 2, looking to the left.

Figs. 5, 6, 7, 8, 9, 10 and 11 are diagrammatic views illustrating the formation and mode of operation of some of the gears involved in the construction shown in Figs. 1 to 4, inclusive.

As thus illustrated, the rear axle of the automobile or motor vehicle comprises shaft sections 1 and 2 connected at their outer ends to the rear wheels of the vehicle, in any suitable or desired manner. The two shaft sections are connected together by a casing or housing comprising two sections which are separably connected together by bolts 3, or by any suitable means. This casing or housing has one section 4 thereof provided with a cylindrical hub portion 5, and the other section 6 of the casing or housing has a cylindrical hub portion 7, the two hub portions being preferably of the same diameter and axially aligned as shown. Anti-friction rollers 8 are interposed between the cylindrical hub portion 5 and the stationary bearing 9, which latter is supported in any suitable manner, as by making this bearing rigid with the outer housing 10 of the axle, as shown in Fig. 1 of the drawings. Similar anti-friction rollers 11 are interposed between the cylindrical hub 7 and the stationary bearing 12, which latter is also supported in any suitable manner, as by making it rigid with said axle housing. The casing section 6 is provided with a bevel gear 13 to engage with the bevel pinion 14 on the rear end of the drive shaft 15, which extends forward in the usual manner, which is driven by the engine of the vehicle. The section 4 of the inner housing has a gear ring 16 secured thereto, by pins 17, or by any suitable means, this ring having specially formed teeth 18, as shown. The shaft section 2 is rigid with the sleeve 19, which is provided at its inner end with the bevel pinion 20, and a special gear 21 is formed with a central socket 22 for engaging the ball or round knob 23 on the inner end of the shaft section 2, in the manner shown. This gear 21 has teeth 24 for engagement with the teeth 18 of the ring gear 17 previously mentioned. It will also be seen that this gear 21 has teeth 25 for engagement with the teeth 26 of the bevel pinion 20 previously mentioned.

Now at the other side of the transmission, the shaft section 1 is rigid with the sleeve 27, which turns in the hub 7, just as the sleeve 19 turns in the hub 5 at the other side. The sleeve 27 has its enlarged inner end provided with an internal ring gear 28, preferably formed integral therewith, and an internal ring gear 29, of slightly greater diameter than the ring gear 28, is arranged in axial alignment with the ring gear 28, at one side thereof, and is made rigid with the casing section 6 by means of pins 30, or any other suitable means. The gears 31 and 32 are of slightly different diameter, as shown, and are bound together by pins 33 or any suitable means. These gears 31 and 32 are rotatively mounted upon the eccentric portion 34 of the member 35, which has a shank or stem 36 that is free to rotate in the bushing 37, which latter is in turn suitably mounted in the hub portion 27 previously mentioned. The gear 31 engages the internal ring gear 28, while the gear 32 engages the internal ring gear 29, and the proportions of these gears, and their arrangement, are shown more clearly in Figs. 3 and 4 of the drawings. A plate 38 is arranged to bear against the internal ring gear 29 and the gear 32, thereby holding the gears 31 and 32 in place. Screws 39 are suitably applied, as shown, through the casing section 6, to wedgingly engage the beveled edge of the plate 38, thereby to keep the latter crowded tightly against the gearing, in the manner shown. The gear 21 is provided with a hub portion 40 having a ball or rounded knob 41 for engagement with the concave socket 42 in the eccentric portion 34 previously mentioned. With the construction shown, there are preferably twenty teeth 26, and there are preferably twenty one teeth 25. The knob 23, previously mentioned, at the end of the shaft section 2, is not integral with the shaft section, but, to the contrary, is formed on a portion 43 inserted in the hub portion 19, and with this arrangement the grooved end portions 44 and 45 are simply inserted in the similarly formed hubs 19 and 27, endwise, so that the two shaft sections will be keyed to their respective hub portions, in the manner shown. The eccentric portion 34, being offset, or eccentric, is counterbalanced by a weight 46 suitably held on the member 35 by pins 47, as shown, so that the weight at opposite sides of the axis of the shaft is balanced.

In Fig. 5, which is a diagrammatic development of the gear teeth 18 and 24, it will be seen that a gyratory action is brought about, on the part of the gear 21, as at times it will roll around upon the gearing 16, in a gyratory manner.

In Fig. 6, which is a diagrammatic development of the gear teeth 25 and 26, it will be seen that the gear 21 will have a gyratory action at different times, under certain conditions, and it will be seen that there are twenty one teeth 25, and twenty teeth 26, as previously explained, so that there will be some relative rotation, during such gyratory action, between the gear 20 and the gear 21 in engagement therewith.

Fig. 7 is a diagrammatic view illustrating the difference in pitch between the internal gears 28 and 29, and the small gears 31 and 32 in engagement therewith, showing how these small gears will roll around on the two internal gears, and because of the difference in diameter of the gears there will be some relative rotation between the two internal gears 28 and 29, and some relative rotation between the shaft section 1 and the bevel gear 13, in a manner that will be readily understood.

Fig. 8 is a diagrammatic view showing the difference in diameter, and the difference in the number of teeth, as previously explained, between the gear 20 and the gear 21, which have the teeth 26 and 25, respectively.

In Fig. 9, the left-hand portion of the diagram shows a development of the gears 28, 29, and 31 and 32 in one position, and shows the gyratory relation of the gear teeth 25 and 26 at such time, at the right.

Fig. 10 is a similar view, showing the relative positions of the different gears at another time.

Fig. 11 is a similar view, showing the relative positions of the gears at a different time.

Thus, with the construction shown and described, power transmitted to the bevel gear 13 will cause the shaft sections 1 and 2 to rotate in unison, regardless of whether the load on one shaft section is exactly the same as the load on the other shaft section, or even with one rear wheel of the vehicle off of the ground, so that no load is on one shaft section, there will be no racing of the shaft section upon which there is no load, and neither wheel when raised from the ground will race. At the same time, because of the construction shown and described, and the principles involved, either rear wheel can travel faster than the other when the automobile or other motor vehicle is steered to the right or the left. With ordinary differential gearing, of course, there is practically no power transmitted to one wheel on the ground, when the other wheel is raised from the ground, and the raised wheel will race; but with the construction shown and described, and because of the resistance, leverage and friction offered, as between the various parts, there will be no racing of one wheel when raised from the ground.

It will be understood, of course, that the interior of the housing or casing 6 can be flooded with lubricating oil, of any suitable character. This oil will flow through the passages 48 to lubricate the bearings for the gears 31 and 32, which rotate upon the eccentric portion 34, and to lubricate the bearing of the portion 36 in the bushing 37, as previously explained.

The driving casing 4 and 6 may, of course, be of any suitable character, being primarily and essentially a coupling member between the two axially alined shaft or axial sections 1 and 2, and being the driving member for communicating power to the differential gearing to the two shaft sections. The member 21 is a wabbling gear having both peripheral and lateral teeth thereon, and operating in the manner shown and described.

Thus, the two ring gears 28 and 29 are concentrically arranged, and have different diameters, each gearing being concentric to the axis of the two shaft sections. Also, the two ring gears 16 and 29 are rotatable, as they are rigid with the rotary driving casing 6, there being in this way a ring gear for each shaft section, and means co-operating with these ring gears, to produce the differential driving effect, and the anti-racing effect, to prevent racing of either wheel when raised from the ground, in the manner explained.

The pinions 31 and 32, it will be seen, rotate about an axis parallel with the axis of the ring gears 16, 28 and 29, and hence the gear mechanism co-operating with the said ring gears has at least one axis which is parallel with the axis of the ring gears, and which is parallel with the axis of the shaft sections also.

Without disclaiming anything, and without prejudice to any novelty disclosed, what I claim as my invention is.

1. In gearing, the combination of axially alined shaft sections, a rotary casing having end portions sleeved over said shaft sections, a lateral tooth ring gear rigid with said casing, a bevel gear adjacent said ring gear and keyed to one shaft section, a gyratory wabble gear provided with peripheral teeth engaging the ring gear, and with lateral teeth engaging the bevel gear, means axially alined with said one shaft section to form a supporting bearing for said wabble gear at one side thereof, means eccentric to the other shaft section to form a supporting bearing for said wabble gear at the other side thereof, an internal tooth ring gear rigid with said casing and encircling said eccentric bearing, a smaller internal tooth ring gear disposed at one side of said first mentioned internal tooth gear and keyed to said other shaft section, a double pinion mounted on said eccentric bearing and provided with two toothed peripheries of different diameter engaging said internal tooth ring gears, and means for rotating said casing.

2. A structure as specified in claim 1, said first mentioned ring gear encircling said bevel gear, and the teeth of this ring gear and of the bevel gear facing in the direction of the plane of the second mentioned ring gear, the third mentioned ring gear being rotatable relatively to both the first and the second mentioned ring gears.

3. A structure as specified in claim 1, said first mentioned ring gear and said bevel gear being relatively rotatable at one side of said wabble gear, and said second mentioned ring gear and said third mentioned ring gear being relatively rotatable at the other side of said wabble gear, the three ring gears being disposed in three separate parallel planes extending at right angles to the axis of said shaft sections, and said bevel gear having its teeth in the plane of the teeth of said first mentioned ring gear.

4. A structure as specified in claim 1, comprising a flat ring disposed within said casing, against one side of said double pinion, to hold said pinion against axial displacement from said eccentric bearing, and detachable means engaging edge portions of said plate to hold the plate rigidly in place against one side of said second mentioned ring gear.

Specification signed this twenty-fourth day of November, 1924.

GEORGE L. CADMAN.